United States Patent Office 3,582,385
Patented June 1, 1971

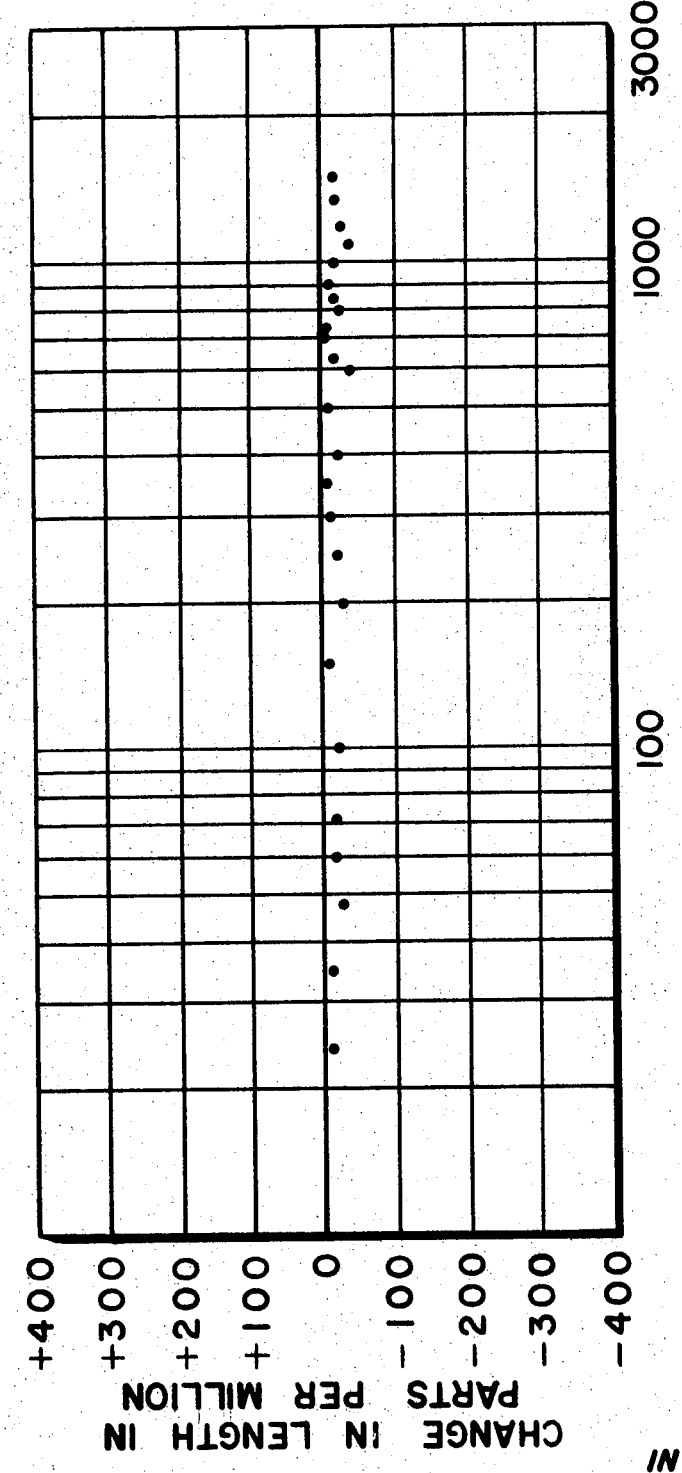

3,582,385
THERMALLY CRYSTALLIZABLE GLASS AND GLASS-CERAMIC ARTICLE
David A. Duke, Corning, Max R. Montierth, Big Flats, and Richard F. Reade, Corning, N.Y., assignors to Corning Glass Works, Corning, N.Y.
Filed Oct. 7, 1968, Ser. No. 765,467
Int. Cl. C03c 3/04, 3/22
U.S. Cl. 106—390V                                          2 Claims

ABSTRACT OF THE DISCLOSURE

This invention relates to the production of glass-ceramic articles in the $Li_2O$-$BaO$-$Al_2O_3$-$SiO_2$ composition field which, when nucleated with $TiO_2$ and, optionally, $ZrO_2$ to form beta-spodumene solid solution and celsian as the principal crystal phases, exhibit an average coefficient of thermal expansion (25°–900° C.) of less than $15 \times 10^{-7}$/° C. and demonstrate excellent dimensional stability when subjected for long periods of time at temperatures up to about 800° C. or when rapidly thermally cycled from room temperature to temperatures about 800° C. Such glass-ceramic articles are especially suitable for the manufacture of regenerative heat exchangers for use with turbine engines.

---

The production of glass-ceramic articles contemplates the controlled crystallization in situ of glass articles. In general terms, the manufacturing process to obtain such articles comprises three fundamental steps: first, a glass-forming batch of a desired composition is compounded to which a nucleating agent is commonly admixed; second, this batch is melted and the melt cooled to a glass with an article of a desired configuration being shaped therefrom; and, third, the glass shape is exposed to a heat treatment schedule wherein nuclei are initially developed within the glass which act as sites for the growth of crystals thereon as the heat treatment is continued.

Inasmuch as this crystallization in situ is effected through substantially simultaneous growth on countless nuclei, the structure of a glass-ceramic article is free of voids, nonporous, and comprises relatively uniformly-sized, fine-grained crystals homogeneously dispersed in a glassy matrix, these crystals constituting the predominant proportion of the article. Therefore, glass-ceramic articles are generally defined as being greater than 50% by weight crystalline and, frequently, are actually greater than 90% by weight crystalline. It will be readily appreciated that such high crystallinity yields a product demonstrating chemical and physical properties which are usually quite different from those of the parent glass and which are more nearly characteristic of those exhibited by a crystalline article. Furthermore, this very high crystallinity of a glass-ceramic article results in the residual glassy matrix having a much different composition from that of the parent glass since the crystal components will have been precipitated therefrom.

The crystal phases developed within glass-ceramic articles depend upon the composition of the original glass and the heat treatment applied thereto. For a more complete discussion of the theoretical concepts and the practical considerations involved in the production of glass-ceramic articles, reference is made to U.S. Pat. No. 2,920,971.

The manufacture of a honeycomb-type structure such as multi-bore tubing for regenerative heat exchanger units, from thermally crystallizable glasses is described generally in patent application Ser. No. 765,494, entitled "Method and Apparatus for Forming Multi-Bore Tubing," filed of even date herewith in the names of Carl D. Andrysiak and Richard W. Wilson and assigned to a common assignee. That application discloses the drawing of thin glass tubing which, after being stacked together in such a manner to produce a honeycomb-type structure, can be heat treated to crystallize in situ the glass tubing to glass-ceramic tubing. Patent application Ser. No. 765,466, entitled "Method and Apparatus for Forming Honeycomb Structures," also filed of even date herewith in the names of Carl D. Andrysiak, Robert G. Foster, Gerald A. Levine, and Max R. Montierth and assigned to a common assignee, discloses a particular process employing hot flowing gas which is especially suitable for crystallizing in situ honeycomb-type structures manufactured in accordance with Ser. No. 765,494, referred to above. It can be readily recognized that, by its very nature and use, the material forming the honeycomb structure of a regenerative heat exchanger must be able to withstand extreme changes in temperature so that cracks leading to destruction of the structure will not occur. Further, the material must be dimensionally stable at high temperatures. Thus, it is desirable that no growth or slumping of the material will occur at elevated temperatures which may result in the subsequent failure of the unit.

Therefore, the principal object of this invention is to provide a glass-ceramic material which exhibits excellent resistance to thermal shock and exceptional dimensional stability upon long exposures to temperatures up to about 800° C. or to repeated thermal cycling from room temperture up to about 800° C.

Another object of this invention is to provide a thermally crystallizable glass which can be melted and formed into multi-bore tubing fabricated into a monolithic structure, and then crystallized in situ without breakage to a glass-ceramic structure which exhibits excellent resistance to thermal shock and exceptional dimensional stability upon long exposures to temperatures up to about 800° C. or to repeated thermal cycling from room temperature up to about 800° C.

Other objects of this invention will become apparent from a reading of the following description of the invention and an inspection of the appended drawing which comprises a graph illustrating the long time dimensional stability at high temperatures demonstrated by the glass-ceramic articles of this invention.

We have discovered that these objects of the invention can be achieved through a very narrow range of thermally crystallizable glass compositions within the

field which are nucleated with $TiO_2$ and, optionally, $ZrO_2$. Such glasses, when heat treated in accordance with the method of this invention, can be crystallized in situ to yield low-expansion glass-ceramic materials displaying excellent dimensional stability at high temperatures. The primary crystal phase developed is beta-spodumene solid solution consisting principally of spodumene ($LiAlSi_2O_6$), $Al_2O_3$, and $SiO_2$ with a minor amount of celsian

also being present. A very minor amount of $TiO_2$ as anatase or rutile will also generally be observed. The coefficient of thermal expansion of these glass-ceramic articles (25°–900° C.) ranges between about $0$–$15 \times 10^{-7}$/° C. and after more than 1000 hours at 800° C. the change in length of the article is normally less than 200 parts/million and, frequently, no more than 100 parts/million.

In general terms, our invention comprises melting a batch for a glass consisting essentially, by weight on the oxide basis, of 3.5–5% $Li_2O$, 2.5–5% BaO, 15–21% $Al_2O_3$, 65–75% $SiO_2$, and 3.5–8% of a nucleating agent, said nucleating agent consisting of 3–8% $TiO_2$ and 0–3% $ZrO_2$. In any event, the total amount of $Li_2O$, BaO, $Al_2O_3$, $SiO_2$, $TiO_2$, and $ZrO_2$ must constitute at least 98% by weight of the glass composition. The melt is then simultaneously cooled to a glass and an article of a desired configuration shaped therefrom. Finally, the glass article is heated to the nucleation range (700°–900° C.), maintained within that temperature range for a sufficient length of time to insure the substantial development of nuclei, and thereafter heated to the crystallization range (900°–1200° C.) and held within that temperature range for a sufficient length of time to cause a major proportion of the glass to crystallize.

Since these glasses nucleate very quickly and, particularly, where thin-walled tubing such as is utilized in honeycomb structures comprises the article to be crystallized in situ, nucleation times as short as 10–15 minutes may be adequate. Much longer nucleation times, such as 12 hours, can be employed and crystals will begin to grow on these nuclei after long dwell periods within this temperature range. However, this practice is not commercially economical and the nucleated article is generally heated to higher temperatures to expedite crystal growth. Hence, four hours has been deemed a practical maximum for the nucleation period.

The growth of crystals upon the nuclei is likewise very rapid at temperatures within the stated crystallization range and with thin-walled articles, such as the above-described honeycomb structures, crystallization times as brief as one hour may yield highly crystalline bodies containing the desired crystal phases of beta-spodumene solid solution and celsian. Much longer crystallization times may be utilized successfully but, in general, commercial practice dictates the use of the shortest times which will produce a satisfactorily crystallized article with the proper crystal phases therein. Therefore, 24 hours has been considered a practical maximum crystallization period.

Table I reports examples of thermally crystallizable glasses having compositions, expressed in weight percent on the oxide basis, suitable for the practice of this invention. It will be understood that the actual batch ingredients for these glasses can comprise any materials, either oxides or other compounds, which on being melted together, are transformed to the desired oxide compositions in the proper proportions. The batch materials were dry ballmilled together to aid in obtaining a homogeneous melt, placed in open platinum crucibles equipped with a platinum stirring device, and melted for times ranging between about 6–16 hours at 1550°–1650° C. Glass cane about ¼" in diameter was hand drawn from each melt and the remainder then poured onto a steel sheet to form a round patty about ⅜" thick and about 5" in diameter. The glass was then transferred to an annealer operating at about 600° C. $As_2O_3$ was included in the composition as a fining agent although it will be appreciated that other fining agents such as $Sb_2O_3$, chloride, or sulfate may also be employed satisfactorily.

are operable where very thick or very thin shapes, respectively, are being treated. However, the 200° C./hour rate has been adjudged to be satisfactory in most instances in preventing breakage due to thermal shock and excessive deformation of the glass article as it is being heated above its softening point and before crystallization has progressed to a sufficient extent to support the body.

Crystallization of the glass body takes place more rapidly as the temperature is raised. Hence, in the early stages of crystallization, the proportion of glassy matrix to crystals is very great and the body will readily deform if the temperature thereof is increased too rapidly as the softening point of the glass is approached and surpassed. Therefore, the rate of temperature rise should, preferably, balance the rate at which crystals are growing within the glass with the required degree of fluidity in the residual glass needed to avoid stress buildup and cracking. In view of this factor, then, it can be appreciated that no dwell periods, as such, are required within the nucleation and crystallization ranges, but only a schedule wherein the body moves through the nucleation zone and within the crystallization range. Nevertheless, the utilization of specific dwell times within the two zones insures the requisite nucleation and subsequent crystal growth and, hence, is the preferred practice of the invention.

The rate of cooling the crystallized article to room temperature is also dependent upon its resistance to thermal shock and here, again, the size of the article and the top heat treating temperature employed dictate the rate selected. A 200° C. per hour cooling rate has yielded sound products in all sizes of articles tried by us. Much faster rates have been utilized with thin-walled articles, such as the honeycomb structures, with no breakage thereof. In many instances, the crystallized articles were merely removed directly from the heat treating chamber and allowed to cool in the ambient atmosphere.

Finally, where fuel economies and speed of production are sought in manufacturing the glass-ceramic articles, the glass shapes need not be cooled to room temperature and then reheated into the nucleation and crystallization zones. Cooling the glass shapes to room temperature permits the visual inspection of the quality thereof. In lieu of this, the glass melt may merely be cooled to just below the transformation range thereof and an article of a desired configuration shaped therefrom (the transformation range being that temperature at which a liquid melt is deemed to have been transformed into an amorphous solid), and the glass shape then exposed to the required heat treating schedule. The transformation range is a temperature in the vicinity of the annealing point of a glass which, with the compositions of this invention, ranges about 600°–700° C.

Table II records the heat treatment schedule to which cane samples of each example was subjected along with the primary crystal phases present as determined by X-ray diffraction analysis and the coefficient of thermal expansion (25°–900° C.) as determined in the conventional manner utilizing a differential dilatometer. Electron microscopy demonstrated the glass-ceramic articles to be highly

TABLE I

| Example | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| $SiO_2$ | 69.8 | 69.6 | 69.4 | 69.2 | 69.0 | 68.8 | 69.7 | 69.7 | 68.8 | 69.3 | 67.8 | 70.7 | 68.4 | 70.3 | 65.6 | 67.1 | 70.5 | 67.8 | 73.5 | 70.9 | 68.6 |
| $Al_2O_3$ | 17.7 | 17.7 | 17.7 | 17.7 | 17.7 | 17.7 | 17.8 | 17.5 | 17.7 | 17.1 | 17.7 | 17.2 | 16.6 | 17.8 | 20.1 | 17.4 | 17.8 | 19.1 | 15.2 | 16.5 | 16.5 |
| $Li_2O$ | 4.4 | 4.4 | 4.4 | 4.4 | 4.4 | 4.4 | 4.3 | 4.4 | 4.4 | 4.4 | 4.4 | 4.3 | 4.1 | 4.3 | 4.9 | 4.2 | 4.4 | 5.0 | 3.9 | 4.3 | 4.3 |
| BaO | 3.0 | 3.2 | 3.4 | 3.6 | 3.8 | 4.0 | 3.1 | 3.0 | 3.3 | 3.3 | 5.0 | 2.9 | 2.9 | 2.5 | 3.4 | 2.9 | 3.0 | 3.0 | 2.7 | 2.9 | 2.9 |
| $TiO_2$ | 4.3 | 4.3 | 4.3 | 4.3 | 4.3 | 4.3 | 4.3 | 4.3 | 5.1 | 5.1 | 4.3 | 4.2 | 7.2 | 4.3 | 5.2 | 7.6 | 3.5 | 4.3 | 3.9 | 3.0 | 4.6 |
| $ZrO_2$ | | | | | | | | | | | | | | | | | | | | 1.6 | 2.3 |
| $As_2O_3$ | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |

In the examples of Table I, the glass articles were heated to the nucleation range and subsequently to the crystallization range at about 200° C./hour. It will be recognized that slower or faster temperature increases crystalline, viz., greater than 75% by weight crystalline and frequently over 90% by weight crystalline. The crystals, themselves, are substantially all finer than 5 microns in diameter with the preferred size being less than 1 micron. In most all instances, beta-spodumene solid solution constituted at least 75% of the crystallization present with celsian constituting at least 10% thereof. The anatase and rutile varied from a trace up to as much as 5% by weight. Visually, each crystallized article appeared white, opaque, and fine-grained.

limits. The BaO remains in the residual glass during the initial crystallization thereby reducing the tendency to cracking. At higher temperatures, the BaO crystallizes to celsian ($BaO \cdot Al_2O_3 \cdot 2SiO_2$) which tends to reduce grain growth but does not cause thermal instability. We believe this situation obtains because of the large ionic radius

TABLE II

| Example No. | Heat treatment | Crystal phases | Exp. coeff. ($\times 10^{-7}/°$ C.) |
|---|---|---|---|
| 1 | 780° C. for 2 hours; 1,100° C. for 2 hours | Beta-spodumene solid solution, celsian, anatase | 6.6 |
| 2 | do | do | 6.4 |
| 3 | do | do | 5.9 |
| 4 | do | do | 6.9 |
| 5 | do | Beta-spodumene solid solution, clesian, rutile | 8.2 |
| 6 | do | do | 10.1 |
| 7 | 800° C. for 2 hours; 1,090° C. for 2 hours | do | 6.9 |
| 8 | 780° C. for 2 hours; 1,100° C. for 2 hours | Beta-spodumene solid solution, celsian, anatase | 7.6 |
| 9 | do | Beta-spodumene solid solution, celsian, anatase, and rutile. | 8.5 |
| 10 | do | Beta-spodumene solid solution, celsian, anatase | 8.3 |
| 11 | do | do | 9.8 |
| 12 | do | do | |
| 13 | do | do | 9.0 |
| 14 | do | do | |
| 15 | 750° C. for 4 hours; 1,100° C. for 2 hours; 1,050° C. for 10 hours | do | 8.3 |
| 16 | 780° C. for 2 hours; 1,100° C. for 2 hours | do | |
| 17 | do | do | 5.0 |
| 18 | 780° C. for 2 hours; 1,050° C. for 10 hours | Beta-spodumene solid solution, celsian, rutile | |
| 19 | 780° C. for 2 hours; 1,100° C. for 2 hours | do | |
| 20 | do | do | |
| 21 | 750° C. for 4 hours; 1,100° C. for 2 hours; 1,050° C. for 10 hours | do | 68.6 |

The composition of the thermally crystallizable glass is critical in securing the required crystallinity in the product and the necessary presence of beta-spodumene solid solution and celsian such that a low-expansion, thermally stable article is developed. Hence, the amounts of $Li_2O$, $BaO$, $Al_2O_3$, and $SiO_2$ with the nucleating agent ($TiO_2$ with or without $ZrO_2$) must comprise at least 98% by weight of the total composition. While very minor amounts of such compatible metal oxides as $Na_2O$, $K_2O$, $MgO$, $CaO$, $ZnO$, $Fe_2O_3$, $B_2O_3$, and $PbO$ may be tolerated, their complete absence is preferred.

Referring now specifically to honeycomb-type structures suitable for heat exchangers, the requirements for a glass-ceramic material operable therefor are four: (1) low coefficient of thermal expansion; (2) good mechanical strength; (3) high heat capacity; and (4) dimensional stability after thermal cycling.

Glass-ceramic articles having low coefficients of thermal expansion due to the presence of beta-spodumene as the principal crystal phase are disclosed in United States Patent No. 3,157,522. Nevertheless, we have discovered that to achieve dimensional stability upon thermal cycling in such articles it is necessary to eliminate those oxides, e.g., $MgO$, $ZnO$, and $B_2O_3$, which may tend to form secondary crystal phases whose solid solubility with beta-spodumene varies as a function of temperature. In addition, alkali metal oxides such as $Na_2O$ and $K_2O$ are prone to develop a residual glass which also can reduce thermal stability. However, when all such oxides are removed the resultant glass-ceramic article is thermally stable but is not readily crystallized without cracking. Hence, some fluidity must be retained to permit stress release in the initial crystallization of the glass to beta quartz solid solution where there is a great exothermic reaction and a density change. The conversion of beta-quartz solid solution to beta-spodumene solid solution occurs as the heat treatment is continued. In addition, ternary $Li_2O$-$Al_2O_3$-$SiO_2$ compositions nucleated with $TiO_2$ are likely to exhibit considerable secondary grain growth due to the absence of a growth-inhibiting second crystal phase.

We have now found a narrow composition range within the $Li_2O$-$Al_2O_3$-$SiO_2$ field which can be nucleated with $TiO_2$ and, optionally, $ZrO_2$, crystallized in situ without cracking, and still maintain low expansion and dimensional stability. This finding is based upon the addition of BaO to the glass composition within strictly specified of the barium ion which does not allow it to enter into the spodumene structure. As a result, there is no change in the crystal structure upon thermal cycling and dimensional stability is maintained. X-ray diffraction analysis has tended to confirm this absence of change in crystal structure upon thermal cycling.

The heat treatment to which the glass compositions of this invention are exposed is also important. Hence, to achieve the most desirable glass-ceramic properties, a very fine-grained microstructure is necessary. Furthermore, the maximum development of celsian results in less grain growth, less high temperature creep, and the best dimensional stability. The greatest degree of crystallization is also most desirable since the minute amount of residual glass which is dispersed within the product will then be very highly siliceous with, consequently, a very high viscosity.

The excellent dimensional stability of these glass-ceramic materials during long term exposures to high temperatures is graphically illustrated in the appended drawing. That graph (semilogarithmic scale) depicts the change in length exhibited by a crystallized 4" long section of a honeycomb-type structure utilizing the composition of Example 7. The honeycomb-type structure was manufactured from thin-walled multi-bore glass tubing, in accordance with the method disclosed in Ser. No. 765,494 referred to above and crystallized in situ following the flowing hot gas process described in Ser. No. 765,466, also referred to above.

Thus, there are three basic steps in forming a honey comb heat exchanger structure from multi-bore tubing: first, fusion of the multi-bore tubing into segments of convenient size for further fabrication; second, nucleation of the fused glass segments; and, third, crystallizing the nucleated glass in situ. It is also possible to nucleate the glass tubing prior to the fusion step but the crystallizing process is always the last step.

Fusion of the glass is effected by heating the multi-bore tubes by passing hot gas therethrough such that a uniform temperature is obtained throughout the cross-section of tubes and simultaneously subjecting the bundle of tubes to a compressive force. The tubes are fusion-joined together by rapidly heating to a temperature where viscous flow is possible and then rapidly cooling the tubes, following sealing, to preclude the growth of crystals therein.

Nucleation of the glass tubing is accomplished by holding at a temperature above the transformation range of the glass but sufficiently below the softening point thereof such that deformation or slumping of the structure is not hazarded.

Crystallization of the glass tubing is effected by rapidly heating the nucleated tubing, utilizing a flow of hot gas therethrough, to the crystallization range. The flow of hot gas insures against breakage of the honeycomb structure during crystallization thereof by suppressing the kinetics of crystallization through the mechanism of permitting the gas stream to remove the heat of crystallization at a rate equivalent to that at which it is generated through the inherent exothermic reaction of crystallization. Thus, there is a relatively even temperature distribution throughout the honeycomb structure which eliminates hot spots therein which could result in breakage. This process, then, makes it possible for crystallization to take place at a temperature which is sufficiently high to allow stress-relieving viscous flow therein as the crystallization proceeds.

Beta-spodumene solid solution crystallizes in situ very rapidly and a few minutes dwell time within the crystallization temperature range secures the conversion of beta-quartz to beta-spodumene. The development of the celsian phase requires a longer heat treatment and is normally obtained by an extended dwell time within the crystallization temperature range utilizing a conventional electric or gas-fired furnace.

Utilizing the gas flow to suppress crystallization, as described in the previous paragraph, is one method whereby honeycomb-type structures have been satisfactorily crystallized. However, an alternative method has been developed which is founded upon a principle directly opposite to that of the former method. Thus, in this alternative method, crystallization is not suppressed but, rather, the honeycomb-type structure is heated so rapidly that viscous flow always occurs in the residual glassy matrix despite the extremely rapid rate of crystallization. This latter method is very attractive from a commercial point of view since much less time is required in crystallizing the structure and the final product exhibits excellent high temperature dimensional stability. The following heat treatment schedule is representative of this latter method and was employed in crystallizing the 4″ long section of honeycomb-type structure which comprised the article referred to in the appended drawing:

(I) FUSION SEALING PROCESS (1) Heat structure to 750° C. within five minutes with an accompanying flow of air through the structure equivalent to 15″ of water (c. ½ p.s.i.). The structure is held mechanically with a 300 lb. load.

(2) Hold structure at 750° C. for five minutes to equilibrate temperature within the furnace and increase flow of air therethrough to about 30″ of water (c. 1 p.s.i.).

(3) Heat structure to 840° C. in one minute.

(4) Hold structure at 840° C. for a sufficient length of time until the desired deformation under the 300 lb. compression load occurs to seal the tubing together.

(5) Reduce compression load to 30 lbs. to avoid further deformation.

(6) Cool to room temperature within 25 minutes.

(7) Stop flow of air and release structure from load.

(II) NUCLEATION PROCESS (1) Heat structure at 240° C./hour to 740° C.

(2) Hold at 740° C. for three hours.

(3) Cool to room temperature at furnace rate (c. 3° C./minute).

(III) CRYSTALLIZATION PROCESS (1)) Heat structure to 750° C. within five minutes utilizing a flow of air through the structure equivalent to 15″ of water (c. ½ p.s.i.). The structure is held mechanically under a 30 lb. load.

(2) Hold structure at 750° C. for five minutes to equilibrate temperature within furnace and increase flow of air therethrough to about 30″ of water (c. 1 p.s.i.).

(3) Heat structure to 1120° C. in two minutes.

(4) Hold structure at 1120° C. for 10 minutes.

(5) Cool to room temperature within 15 minutes.

(6) Stop flow of air and release structure from load.

(7) Heat structure at 320° C./hour to 1100° C.

(8) Hold at 1100° C. for two hours.

(9) Reduce temperature at 320° C./hour to 1070° C.

(10) Hold at 1070° C. for 10 hours.

(11) Cool to room temperature at furnace rate (c. 3° C./minute).

This 4″ section was heated to 800° C. and held thereat for about 1000 hours with changes in length thereof being recorded at that temperature after various lengths of time by means of a length comparator of the type described by Wilmer Souder and Peter Hidnet, "Measurement of Thermal Expansion of Fused Silica," Scientific Papers of the Bureau of Standards, vol. 21, pages 1–23, Sept. 21, 1965. As can be easily observed from the graph, the greatest change in length measured up to about 1000 hours' duration was approximately 50 parts/million. In general, the honeycomb structures made in accordance with this invention exhibit a change in length of no more than about 100 parts/million after long term heating at temperatures about 800° C.

Although this invention has been described with particular reference to honeycomb-type structures for regenerative heat exchangers, it will be appreciated that the exceptional dimensional stability of these crystallized materials at high temperatures and the low coefficient of thermal expansion thereof cause them to be eminently useful in such other applications as emission controls reactors, calcining trays, and kiln furniture.

We claim:

1. A thermally crystallizable glass consisting essentially, by weight on the oxide basis, of about 3.5–5% $Li_2O$, 2.5–5% BaO, 15–21% $Al_2O_3$, 65–75% $SiO_2$, and 3.5–8% of a nucleating agent, said nucleating agent consisting of 3–8% $TiO_2$ and 0–3% $ZrO_2$, the sum of the $Li_2O$, BaO, $Al_2O_3$, $SiO_2$, $TiO_2$, and $ZrO_2$ constituting at least 98% by weight of the total composition.

2. A white, opaque glass-ceramic article having an average coefficient of thermal expansion (25°–900° C.) between about $0–15 \times 10^{-7}$/° C. and excellent dimensional stability at temperatures up to about 800° C. consisting of fine-grained crystals of beta-spodumene solid solution and celsian uniformly dispersed in a glassy matrix, said crystals comprising at least 75% by weight of the article and being formed through the crystallization in situ of a glass article consisting essentially, by weight on the oxide basis, of about 3.5–5% $Li_2O$, 2.5–5% BaO, 15–21% $Al_2O_3$, 65–75% $SiO_2$, and 3.5–8% of a nucleating agent, said nucleating agent consisting of 3–8% $TiO_2$ and 0–3% $ZrO_2$, sum of the $Li_2O$, BaO, $Al_2O_3$, $SiO_2$, $TiO_2$ and $ZrO_2$ contents constituting at least 98% by weight of the total composition.

References Cited

UNITED STATES PATENTS

| | | | |
|---|---|---|---|
| 3,241,985 | 3/1966 | Kuwayama | 106—39 |
| 3,251,403 | 5/1966 | Smith | 106—39 |
| 3,380,818 | 4/1968 | Smith I | 106—39 |
| 3,473,936 | 10/1969 | Smith II | 106—39 |

HELEN M. McCARTHY, Primary Examiner

U.S. Cl. X.R.

65—33; 106—52